March 13, 1951      H. E. WATKINS      2,545,399
MEAT GRINDING BLADE SHARPENER
Filed Feb. 23, 1950
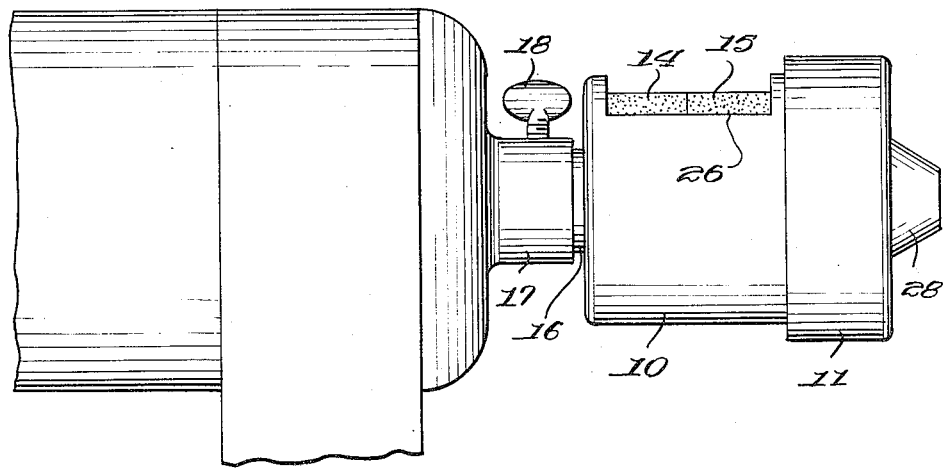
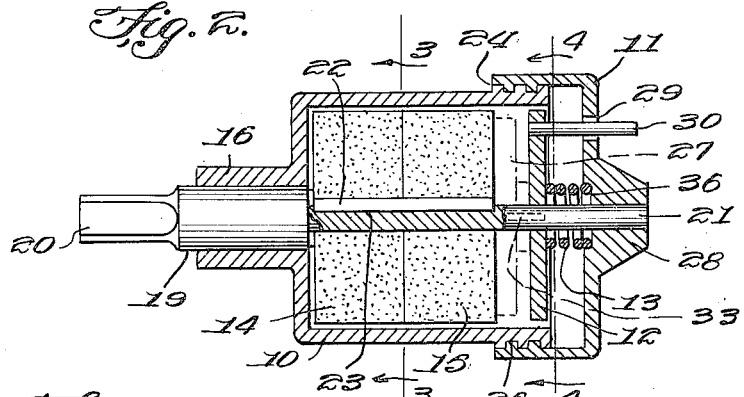
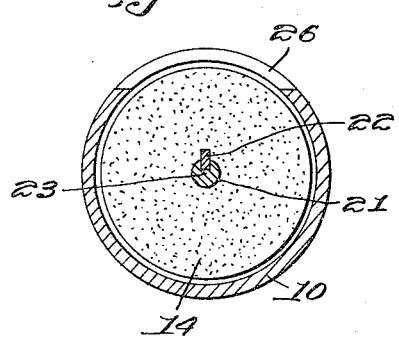
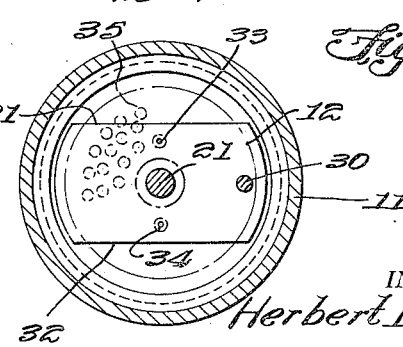
INVENTOR.
*Herbert E. Watkins*
BY *Victor J. Evans & Co.*
ATTORNEYS Patented Mar. 13, 1951

2,545,399

UNITED STATES PATENT OFFICE 2,545,399

MEAT GRINDING BLADE SHARPENER

Herbert E. Watkins, Clearwater, Fla.

Application February 23, 1950, Serial No. 145,654

6 Claims. (Cl. 51—241)

This invention relates to attachments for meat grinders for grinding a blade or knife or for grinding meat cutting knives and in particular the invention relates to an attachment that is mounted on a meat grinder after the grinding head or other attachments have been removed and which provides means for sharpening knives at the same time the grinder blade is being sharpened or ground.

The purpose of this invention is to provide a grinding attachment for sharpening the knife or blade of a meat grinder by using the power of the grinder and in which the grinding elements are positioned on the machine in place of the grinding head thereof.

Various devices have been provided for sharpening blades and knives of meat grinders but it is difficult to use the shaft of the meat grinder for this purpose without changing the design of the housing or without using elaborate attaching elements. With this thought in mind this invention contemplates a grinding wheel positioned on the shaft of the grinder and a housing positioned over the grinding wheel in which means is provided for resiliently urging the knife or blade of the grinder against the grinding wheel.

The object of this invention is, therefore, to provide means for forming a blade sharpening attachment whereby the attachment may readily be attached over the shaft of the grinder with the grinding head removed.

Another object of the invention is to provide a blade and knife sharpening attachment for meat grinders that may be used without changing the design or arrangement of the grinder.

A further object of the invention is to provide a blade sharpening attachment for meat grinders which is of a simple and economical construction.

With these and other objects and advantages in view the invention embodies a housing adapted to be secured to the housing of the meat grinder by a set screw or the like, grinding wheels mounted on the shaft of the grinder and positioned in the housing, a cap threaded on the outer end of the housing, an adapter for holding the grinding or cutting plate, and a spring for urging the plate or cutter against the end of the grinding wheel.

Other features and advantages of the invention will appear from the following description taken in connection with the drawing wherein:

Figure 1 is a side elevational view illustrating the attachment mounted over the end of the shaft of the grinder.

Figure 2 is a vertical section through the attachment with parts broken away showing the method of keying the grinding wheels to the shaft of the meat grinder.

Figure 3 is a cross section through the housing of the attachment taken on line 3—3 of Figure 2.

Figure 4 is a similar section taken on line 4—4 of Figure 2.

Referring now to the drawing wherein like reference characters denote corresponding parts the meat grinder knife and blade sharpening attachment of this invention includes a housing 10, a cap 11, an adapter 12, a spring 13, and grinding wheels 14 and 15.

As illustrated in Figures 1 and 2 the housing 10 is provided with a hub 16 by which it is secured in a hub 17 of a meat grinder by a set or thumb screw 18. The hub 16 is positioned over an enlarged section 19 of the grinder shaft 20 and the grinding wheels 14 and 15 are keyed to the grinder shaft section 21 by a key 22 that is positioned in a keyway 23 in the shaft section 21.

The outer end of the housing 10 is provided with threads 24 on which the cap 11, which is provided with threads 25 in the inner surface is screwed.

The upper surface of the housing 10 is provided with an opening 26 through which the grinding wheels 14 and 15 are exposed and knives may be positioned against the grinding wheels through this opening whereby the knives may be sharpened as a cutter or blade, as indicated by the numeral 27 is sharpened.

The cap 11 is provided with a hub 28 in which the outer end of the shaft section 21 is journaled and the outer wall of the cap is provided with an opening 29 through which a pin 30 on the adapter plate 12 extends, as shown in Figure 2.

The adapter 12, which is formed as illustrated in Figure 4 with flat upper and lower surfaces 31 and 32 is provided with holding pins 33 and 34 that extend into openings 35 through the cutter or blade 27.

The adapter plate 12 is freely slidable on the shaft 21 and the spring 13, the outer end of which is positioned in the recess 36 urges the adapter 12 against the cutter or blade 27 whereby the opposite face of the cutter or blade is resiliently held against the end of the grinding wheel 15.

With the parts arranged in this manner the meat grinding head of the meat grinder is removed and replaced by the attachment which is secured in position by the thumb screw 18, or the like and with the cutter or cutting blade of the grinder resiliently held against the outer end of the grinding wheel the grinding wheel is rotated whereby the face of the cutter or blade is ground and sharpened. At the same time cutting knives may be sharpened on the upper surfaces of the grinding wheels 14 and 15 which extend through the openings 26 in the upper part of the housing.

It will be understood that modifications may be made in the design and arrangement of the parts without departing from the spirit of the invention.

What is claimed is:

1. A meat grinder cutter sharpening attachment comprising a housing adapted to be mounted on a meat grinder over the shaft of the grinder, a grinding wheel mounted on the shaft and positioned in the housing, a cap threaded on the outer end of the housing, means preventing rotation of a cutter blade positioned between the cap and grinding wheel and means positioned between the cap and cutter blade urging the cutter blade against the said grinding wheel.

2. A meat grinder cutter sharpening attachment comprising a housing adapted to be mounted on a meat grinder over the shaft of the grinder, a grinding wheel mounted on the shaft and positioned in the housing, a cap threaded on the outer end of the housing means positioned between the cap and grinding wheel for urging the cutter blade against the said grinding wheel, and means preventing rotation of the said cutter blade.

3. A meat grinder cutter sharpening attachment comprising a housing having an opening in one side thereof adapted to be mounted on a meat grinder over the shaft of the grinder, a grinding wheel mounted on the shaft and positioned in the housing, means urging the cutter blade against the said grinding wheel, a cap threaded on the outer end of the housing and in which the outer end of the shaft is journaled, an adapter positioned over the shaft and located in the outer end of the housing, a spring positioned between the cap and adapter, and means mounting the housing on the grinder.

4. A meat grinder cutter sharpening attachment comprising a housing having an opening in one side thereof adapted to be mounted on a meat grinder over the shaft of the grinder, a grinding wheel mounted on the shaft and positioned in the housing, means urging the cutter blade against the said grinding wheel, a cap threaded on the outer end of the housing and in which the outer end of the shaft is journaled, an adapter positioned over the shaft and located in the outer end of the housing, a spring positioned between the cap and adapter, and means mounting the housing on the grinder, said adapter having a pin extended through an opening in the cap and also having pins extending for engagement with the openings in a cutter blade positioned between the adapter and grinding wheel.

5. A meat grinder cutter sharpening attachment comprising a housing having an opening in one side thereof adapted to be mounted on a meat grinder over the shaft of the grinder, a grinding wheel mounted on the shaft and positioned in the housing, means urging the cutter blade against the said grinding wheel, a cap threaded on the outer end of the housing and in which the outer end of the shaft is journaled, an adapter positioned over the shaft and located in the outer end of the housing, a spring positioned between the cap and adapter, means mounting the housing on the grinder, said adapter having a pin extended through an opening in the cap and also having pins extending for engagement with openings in a cutter blade positioned between the adapter and grinding wheel, said housing having a hub extended from one end positioned to extend into a hub of the grinder whereby the housing is secured to the grinder by a thumb screw in the hub of the grinder.

6. In a meat grinder attachment, the combination which comprises a housing having a hub extended at one end for mounting the housing in a meat grinder with the grinding head of the grinder removed and with the housing positioned over the grinding shaft, grinding wheels mounted on the grinder shaft, a cap threaded on the outer end of the housing having a hub in which the grinder shaft is journaled and also having an opening therethrough, an adapter mounted over the grinder shaft and positioned in the outer end of the housing, said adapter having a pin extended through the opening of the cap and also having pins extended for engagement with openings in a cutter blade positioned between the adapter and grinding wheels, and a spring positioned around the shaft and mounted between the cap and adapter for urging the cutter blade toward the grinding wheels.

HERBERT E. WATKINS.

REFERENCES CITED

The following references are of record in the file of this patent:

UNITED STATES PATENTS

| Number | Name | Date |
| --- | --- | --- |
| 1,438,447 | Luman | Dec. 12, 1922 |